United States Patent Office 3,483,142
Patented Dec. 9, 1969

3,483,142
PROCESS FOR MAKING INORGANIC POLYMERS
Anthony Joseph Saraceno, Devon, Pa., assignor to Pennsalt Chemicals Corporation, Philadelphia, Pa., a corporation of Pennsylvania
No Drawing. Filed Oct. 6, 1966, Ser. No. 584,685
Int. Cl. C08g 33/20
U.S. Cl. 260—2
12 Claims

ABSTRACT OF THE DISCLOSURE

Process for preparing cross linked coordination polymers and copolymers involving a bridged (catenated) trivalent octahedral metal whereby the polymer backbone is entirely inorganic and the crosslinking compound is characterized by having a terminal ionic valence and a terminal group capable of forming a coordinate bond. The polymers and copolymers made by the process have high strength and are useful for conversion to tough fabricated articles.

---

This invention deals with a process for making novel coordination polymers which are crosslinked polymers and copolymers involving a bridged (catenated) trivalent octahedral metal whereby the polymer backbone is entirely inorganic. These novel polymers and copolymers have high strength and are useful for conversion to tough fabricated articles.

In accord with the invention described by Saraceno in U.S. Patent 3,275,574 issued on Sept. 27, 1966, polymers and copolymers have been made which have the repeating units $M(a)(b)X_2$ wherein M is a trivalent octahedral metal, $a$ is a unidentate ligand having a charge of minus one (that is, it is a negative monovalent ion), $b$ is a neutral unidentate ligand, and X is a bridging group also with a charge of minus one. These solid polymers may be represented as compounds containing a plurality of the following recurring units:

wherein M, $a$, $b$ and X are defined above and the repeating units may be the same (homopolymers) or different (copolymers).

The trivalent octahedral metal M may be any of the numerous metals characterized by having a relatively unstable +2 valence which can be oxidized to the stable trivalent oxidation state and has in its trivalent state a coordination number of six (i.e. an octahedral spatial configuration). By a relatively unstable +2 valence state is meant that the metal in its divalent state as its simple salts is capable of being oxidized to its trivalent state by air at ambient temperature and at atmospheric pressure. Such metals will include those metals selected from the group consisting of chromium, iron, ruthenium, europium and ytterbium.

The catenating or bridging group (X in the above formula of the polymers) will have a charge of minus one and will comprise the anion of an acid. Preferably, the acid will be one having the structure $R_2M'(O)OH$ which is based on a group of metals and metalloids of Group V–B; that is, M' is an element of Group V–B having an atomic number greater than seven (e.g., phosphorus, arsenic, antimony and bismuth). M' is preferably phosphorus and the preferred bridging groups are the anions of phosphinic acids. Many of these acids are disclosed by Kosolapoff in his book "Organophosphorus Compounds" (John Wiley, 1950). It is evident that for the purpose of forming the polymer backbone by bridging the octahedral metal M atoms, only three valences of the M' atom in each of the bridging groups are used. Thus the remaining valences of the M' atom are satisfied with the two R groups as shown above in the acid formula $R_2M'(O)OH$. These R groups may be the same or different inert organic groups such as alkyl, aryl, alkoxy, or aryloxy. Preferably, R will be a hydrocarbon alkyl or aryl group containing from one to ten carbon atoms, such as, for example, methyl, ethyl, t-butyl, hexyl, octyl, phenyl, tolyl, xylyl, naphthyl and the like. It will also be understood that the two bridging groups need not be the same.

The unidentate ligand $a$, which will have a charge of minus one, will be a negative inorganic group such as hydroxyl, nitrate, cyanate, thiocynate, cyanide, halide, etc. The unidentate ligand $b$ is a neutral molecule such as water, ammonia, etc. The unidentate ligands $a$ and $b$ will be bonded to the trivalent octahedral metal and these ligands in combination serve to complete the coordination number of six and to give a polymer which is electrically neutral.

The compounds described above have properties which are typical of high polymers. They swell extensively in benzene or in chloroform to give highly viscous solutions which form transparent films and fibers. Films of the polymers plasticized with agents such as tricresyl phosphate and chlorinated polyphenyls have tensile strengths in the range of 100 to above 3000 p.s.i. and show excellent cohesiveness and flexibility. The fibers require no plasticization, being flexible and cohesive at room temperature. Rubbery gels have also been obtained which retain elastomeric properties under the plasticizing influence of solvents. A particularly surprising property of these polymers is their high thermal stability in that no melting of the polymers is observed up to temperatures of 400° C. and, in fact, even after heating fabricated parts to 700° C., the parts still retain structural strength.

The above described polymers, however, are limited where high tensile strength and/or high elongation is required. When relatively high tensile strength is desired, the above polymers require plasticization to eliminate brittleness (i.e., low elongation) and for certain applications the plasticized polymer is too soft and lacking in tensile strength.

It has been found that the above described inorganic polymers may be vastly improved in tensile strength, elongation, and modulus by providing a polymer of the above structure which is crosslinked through replacement of the unidentate ligands $a$ and $b$ with a third bridging group. These improved polymers which are the subject matter of U.S. Ser. No. 584,651, filed of even date herewith, are those having an inorganic backbone consisting of a triply bridged, trivalent, octahedral metal wherein two of said bridging groups are the anions of an acid $R_2M'(O)OH$ where R is selected from the group consisting of alkyl, aryl, alkoxy, and aryloxy, M' is an element selected from Group V–B having an atomic number greater than 7, and wherein the third bridging group is a multiatom group having a terminal ionic valence and a terminal group capable of forming a coordinate bond.

This invention is concerned with a novel and quite versatile method of preparing these improved polymers and involves the crosslinking of the polymers of U.S. 3,275,574. In accord with the process of this invention, a polymer having an inorganic backbone consisting of a doubly bridged, trivalent octahedral metal coordinated with two unidentate ligands wherein each of said bridging groups is the anion of an acid $R_2M'(O)OH$ where R is selected from the group consisting of alkyl, aryl, alkoxy and aryloxy, M' is an element selected from Group V–B having an atomic number greater than 7, and wherein one of said unidentate ligands is a negative monovalent ion and the second unidentate ligand is a neutral molecule selected from the group consisting of water and ammonia is reacted at elevated temperature with a crosslinking compound characterized by having a terminal ionic valence and a terminal group capable of forming a coordinate bond.

The polymer made by the process of the invention may be illustrated by the following structural formula:

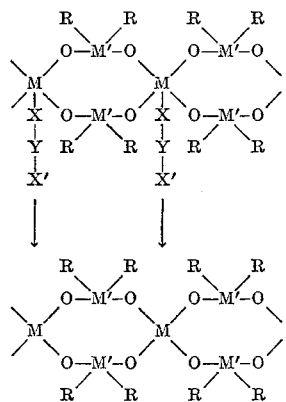

In the above formula —X—Y—X'→ is the crosslinking group. X is an atom having an ionic valence, X' is an atom capable of forming a coordinate bond, and Y is a linking group between X and X'.

It will be observed from the above structural formula for the polymer that the compositions have a highly ordered network or sheet structure. This is believed to contribute to the high structural strength and other properties of the polymers. The polymers are generally insoluble in all common solvents, have good thermal stability and films made from them may vary from soft to hard, but all are of good tensile strength.

In carrying out the process of the invention, the polymer or copolymer described in U.S. 3,275,574 is mixed with the X—Y—X' entity and subjected to heat, usually a temperature between about 80° and 200° C. In one technique the reaction is carried out in the presence of a non-aqueous liquid which is capable of forming an azeotrope with water. In this way, the water ligands which are removed during the reaction, are removed by distillation during the reaction process. The use of the liquid vehicle enhances a thorough and uniform mixture of the two reactants, but is not essential. It is possible to mill or otherwise mix the solid reactants together until a homogeneous mixture is obtained and to simply mold the powder at elevated temperature (e.g., 80° to 200° C.), thereby causing reaction to occur at the temperature of the mold. Alternatively, when a liquid vehicle is used, the liquid may be evaporated off, at which time reaction will occur to give the crosslinked polymer which is left behind.

When using a liquid vehicle system, it will be desirable to employ any of the well-known and common solvents which form an azeotrope with water. Examples of such liquids are aromatic solvents such as xylene, benzene, toluene and the like, or the aliphatic and aromatic halocarbon solvents, such as chloroform and o-dichlorobenzene. Preferred liquids are those having boiling points from about 50° C. to about 300° C., and the preferred solvent for use is o-dichlorobenzene.

The mole ratio of the crosslinking moiety with the double-bridged polymer is not critical, but the reaction will take place on a 1:1 basis. For this reason, it is preferred to employ amounts of reagents which will correspond to one crosslinking entity for each metal atom in the polymer used. It will be understood, however, that an amount of crosslinking agen may be used so that only part of this linear starting polymer is converted to the improved crosslinked polymer.

Examples of preferred crosslinking groups are the oxygen acids and of these the preferred acids are those oxygen acids of elements selected from the group consisting of boron, carbon, nitrogen, silicon, phosphorus, sulfur, arsenic, and tin. Such acids will contain OH and often carbonyl groups which will provide the terminal ionic and covalent bonds. Those valence bonds of the above elements not associated with the ionic and covalent oxygen atoms will be satisfied by numerous groups such as hydroxy, oxygen, amino, alkyl, alkoxy, aryl, aryloxy, and the like. Specific examples of these preferred crosslinking groups include the following:

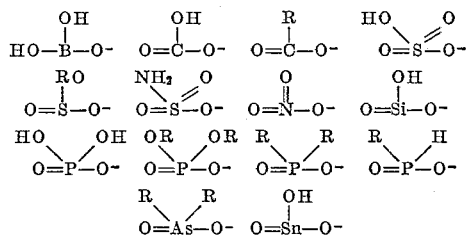

where R in the above structures is alkyl, aryl, alkoxy, aryloxy, etc. The most preferred bridging groups are derived from the phosphorus compounds having the structure

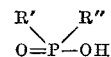

where R' is hydrogen, hydroxy, alkyl, alkoxy, aryl, or aryloxy and R" is hydroxy, alkyl, alkoxy, aryl, or aryloxy, the carbon containing groups having from 1 to about 12 carbon atoms. Specific preferred groups are exemplified by:

| | |
|---|---|
| $(CH_3)_2P(O)OH$ | $(CF_3)_2P(O)OH$ |
| $(C_8H_{17})_2P(O)OH$ | $(C_7F_{15})_2P(O)OH$ |
| $C_6H_5(H)P(O)OH$ | $(C_4H_9O)_2P(O)OH$ |
| $(C_6H_5)_2P(O)OH$ | Phosphoric acid |
| $(C_6H_5)(CH_3)P(O)OH$ | Phenyl phosphinic acid |
| $(C_4H_9)_2P(O)OH$ | Methyl phosphinic acid |

Preferred groups containing sulfur are exemplified by benzene sulfonic acid, p-toluene sulfonic acid, methyl sulfonic acid, ethyl hydrogen sulfate, sulfuric acid, and the like.

Preferred groups containing carbon are the lower aliphatic carboxylic and aromatic carboxylic acids such as acetic acid, propionic acid, benzoic acid, and the like.

It will be understood that copolymers of various types are part of the invention. The compounds may have different R groups in the $M(OM'R_2O)_2$ moiety, and different $M(OM'R_2O)_2$ moieties may be used to make up the polymer. Furthermore, more than one type of $$X—Y—X'$$

moiety may be used and thus different crosslinking groups may be present in a polymer. These variations provide means to modify the properties of the polymer and make possible the preparation of a wide variety of polymers with practically tailormade properties.

In order to further illustrate the invention, the following examples are given:

In the following examples several art accepted abbreviations are used in writing chemical formulae such as:

Me for $CH_3$—
Et for $C_2H_5$—
Pr for $C_3H_7$—
Bu for $C_4H_9$—
Ph for $C_6H_5$—
Ac for $CH_3CO$—

AcCHAc for $CH_3COCHCOCH_3$

THF for Tetrahydrofuran

EXAMPLE 1

A mixture of 0.99 g. of the polymer

[Cr(H$_2$O)(OH)(OP(Ph)(Me)O)$_2$]

(0.0025 mole), 0.35 g. of Me(Ph)PO$_2$H (0.0025 mole) and 25 ml. of orthodichlorobenzene is shaken in a mechanical shaker until a uniformly fine consistency is obtained. The mixture is cast into a petri dish maintained at 110° C. in an air oven. After 8–24 hours the solvent is evaporated leaving behind a cohesive, tough film which analyzes correctly for the polymer

[Cr(OP(Ph)(Me)O)$_3$]

No OH absorption is seen in the I.R. The polymer film has the following mechanical properties: Tensile strength: 7–8000 p.s.i. Percent E 1, Modulus 4×10$^5$ p.s.i. The film is brittle towards creasing. The structural formula for this product is as follows:

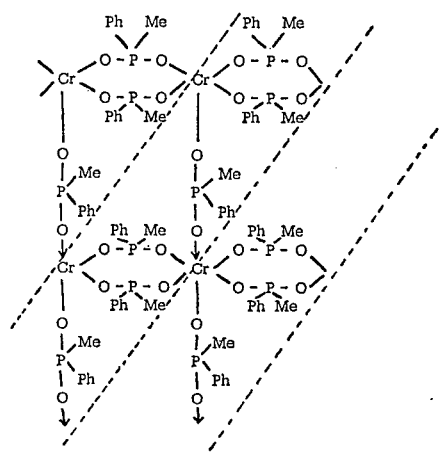

The dashed lines in the above structural configuration are present to indicate that the repeating unit of the polymer is [Cr(OP(Me)(Ph)O)$_3$].

EXAMPLE 2

A mixture of 0.99 g. of the polymer

[Cr(H$_2$O)(OH)(OP(Ph)(Me)O)$_2$]

(0.0025 mole), 0.73 g. of (C$_8$H$_{17}$)$_2$PO$_2$H (0.0025 mole) and 25 ml. of orthodichlorobenzene is shaken on a mechanical shaker to uniform consistency and cast in a petri dish maintained at 110° C. After evaporation of the solvent, a tough, cohesive film of the polymer

[Cr(OP(Ph)(Me)O)$_2$OP(C$_8$H$_{17}$)$_2$O]

is left as a residue. The film has an approximate tensile strength of 4,000 p.s.i., and a percent elongation of 10–15. The film can be creased without fracture.

EXAMPLE 3

A mixture of 1.66 g. of

[Cr(H$_2$O)(OH)(OP(C$_8$H$_{17}$)$_2$O)$_2$]

(0.0025 mole), 0.24 g. of (CH$_3$)$_2$PO$_2$H (0.0025 mole) and 25 ml. of orthodichlorobenzene is stirred magnetically to a uniform consistency. The mixture is poured onto an evaporating dish and thermostatted at 110° C. After the solvent has evaporated, a cohesive, tough film is left behind. The film has a tensile strength of up to 2,000 p.s.i., and an elongation at break of up to 100%. The modulus is 1.8×10$^4$ p.s.i. at 30° and 1.0×10$^4$ at 200° C. The material composition analyzes correctly for the polymer [Cr(OP(CH$_{17}$)$_2$O)$_2$(OP(CH$_3$)$_2$O)]. The film can be repeatedly creased without fracture.

EXAMPLE 4

3.945 g. of [Fe(H$_2$O)(OH)(OPPh(Me)O)$_2$] and 0.94 g. of (CH$_3$)$_2$PO$_2$H are dispersed in 20 ml. of o-dichlorobenzene until a uniform dispersion results. The mixture is poured onto a glass casting dish maintained at 130° C. and heated until all solvent is driven off. A tough cohesive film or plaque is left behind which consists of

[Fe(OPPh(Me)O)$_2$(OP(CH$_3$)$_2$O)]

in composition. This material has a tensile strength of over 5000 p.s.i.

EXAMPLE 5

3.97 g. of Cr(H$_2$O)(OH)(OPPh(Me)O)$_2$ and 2.04 g. of (CF$_3$)$_2$P(O)OH are dispersed in 20 ml. of o-dichlorobenzene until a uniform fine dispersion results. The mixture is poured onto a glasscasting dish maintained at 130° C. and heated until all solvent is driven off. A tough cohesive film is left behind which consists of

[Cr(OPPh(Me)O)$_2$(OP(CF$_3$)$_2$O)]

This film has a tensile strength of over 5000 p.s.i.

EXAMPLE 6

1.1 g. of H$_2$SO$_4$ is dissolved in 10 ml. of tetrahydrofuran and 100 ml. of C$_6$H$_4$Cl$_2$ is added. To the emulsion thus obtained is added 8.3 g. of

[Cr(OP(C$_8$H$_{17}$)$_2$O)$_2$(OH)(H$_2$O)]

The mixture is stirred and heated on a stirrer hot plate for twenty minutes. The dark green solution which results is poured into a crystallizing dish which is placed in an oven overnight at 115° C. After the solvent is evaporated, a dark green putty-like material is recovered. The material is pressed into a 2″ x 1″ x ⅛″ specimen, by heating for two minutes, at 26° C. and at 3000 p.s.i. Tensile strength of the flexible molded plaque is significantly greater than that of the starting polymer.

EXAMPLE 7.—Molding

[Cr(OP(C$_8$H$_{17}$)$_2$O)$_2$(OP(Me)$_2$O)]

A mixture of 1.66 g. of

[Cr(OP(C$_8$H$_{17}$)$_2$O)$_2$(OH)(H$_2$O)]

0.24 g. of Me$_2$PO$_2$H, and 20 ml. of C$_6$H$_6$, is gently heated (235° C.) and stirred to a uniform consistency on a stirrer-hot plate. While stirring, the mixture is placed under a N$_2$ jet, until most of the solvent evaporates. Final traces of solvent are removed by pumping under vacuum at room temperature. The residue is then ground to a fine powder, and is ready for compression molding in a cylinder and piston-type mold. The powder is pressed for ten minutes, at 100° C., 2000 p.s.i., to give a cohesive molded shape.

In this example the fine powder used for the molding operation is a mixture of the starting polymer and the Me$_2$PO$_2$H. When the mixture is placed in the mold, the heat and pressure effect reaction to generate the crosslinked, thermosetting polymer of the invention.

EXAMPLE 8

The above Example 7 is repeated with dimethylarsinic acid to yield the corresponding crosslinked polymer [Cr(OP(C$_8$H$_{17}$)$_2$O)$_2$(OAs(Me)$_2$O)]. A film of this polymer is clear green, flexible, and quite tough.

EXAMPLE 9

A mixture of 3.97 g. of [Cr(MePhPO$_2$)$_2$(OH)(H$_2$O)], 2.90 g. of (C$_8$H$_{17}$)$_2$PO$_2$H, and 10 ml. of C$_6$H$_6$ is stirred and heated at 40° C. for eighteen hours at a uniform consistency on a stirrer-hot plate. The mixture is then treated same as above. The recovered powder is pressed for fifteen minutes at 150° C., 1000 p.s.i., to give a cohesive molded plaque.

EXAMPLE 10

3.3 grams of

[Cr(H$_2$O)(OH)'OP(C$_8$H$_{17}$)$_2$O)$_2$]

(0.005 mole) and 0.71 g. (0.005 mole) of (C$_6$H$_5$)(H)P(O)OH are added to 20 ml. of o-dichlorobenzene and shaken to a uniform dispersion. After 30 hours at 40–45° C. the mixture is poured onto a glass casting dish maintained at 115–120° C. After evaporation of the solvent a flexible film is left behind having the following properties: Tensile strength—1100 p.s.i., percent elongation—120. The film corresponds to the composition

[Cr(OP(C$_8$H$_{17}$)$_2$O)$_2$(OP(C$_6$H$_5$)(H)O)].

EXAMPLE 11

Following the details of Example 10, 0.2 g. of H$_3$PO$_4$ (0.0017 mole) is used instead of phenyl phosphinic acid. The crosslinked polymer film has a tensile strength significantly higher than a film obtained from the starting polymer.

EXAMPLE 12

By following the procedure of Example 10, but using dibutyl phosphinic acid as the third bridging group and maintaining the cast mixture at 150° to 200° C., a crosslinked polymer is likewise obtained.

EXAMPLE 13

Using benzoic acid as the third bridging group in accordance with the procedure of Example 12 gives a crosslinked polymer.

I claim:

1. The process of preparing a crosslinked inorganic polymer which comprises reacting at elevated temperatures a polymer having an inorganic backbone consisting of a doubly bridged, trivalent octahedral metal coordinated with two unidentate ligands wherein each of said bridging groups is the anion of an acid R$_2$M'(O)OH where R is selected from the groups consisting of alkyl, aryl, alkoxy, and aryloxy, M' is an element selected from Group V–B having an atomic number greater than 7, and wherein one of said unidentate ligands is a negative monovalent ion and the second unidentate ligand is a neutral molecule selected from the group consisting of water and ammonia, with a crosslinking compound characterized by the structure O=Y—O⁻ where Y is an element selected from the group consisting of boron, carbon, nitrogen, silicon, phosphorus, sulfur, arsenic and tin and where the valence bonds of Y not associated with the oxygen atoms are satisfied by a member selected from the group of hydrogen, hydroxy, oxygen, amino, alkyl, alkoxy, aryl, aryloxy and fluorocarbon.

2. The process for preparing a crosslinked inorganic polymer which comprises reacting at an elevated temperature a polymer having an inorganic backbone consisting of a doubly bridged chromium atom coordinated with water and a hydroxyl ion and wherein each of said bridging groups is the anion of an avid R$_2$M'(O)OH where R is selected from the group consisting of alkyl, aryl,alkoxy and aryloxy, M' is an element selected from Group X–B having an atomic number greater than 7, with a crosslinking compound characterized by the structure O=Y—O⁻ where Y is an elemene selected from the group consisting of boron, carbon, nitrogen, silicon, phosphorus, sulfur, arsenic and tin and where the valence bonds of Y not associated with the oxygen atoms are satisfied by a member selected from the group of hydrogen, hydroxy, amino, oxygen, alkyl, alkoxy, aryl, aryloxy and fluorocarbon.

3. A process as in claim 2 wherein the crosslinking group is derived from an acid of phosphorus of structure

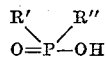

where R' is hydrogen, hydroxy, alkyl, alkoxy, aryl or aryloxy, and R'' is hydroxy, alkyl, alkoxy, aryl, or aryloxy.

4. A process as in claim 2 wherein the crosslinking group is derived from methylphenylphosphinic acid.

5. A process as in claim 2 wherein two of said bridging groups are derived from methylphenylphosphinic acid and the crosslinking group is derived from dimethylphosphinic acid.

6. A process as in claim 2 wherein two of said bridging groups are derived from methylphenylphosphinic acid and the crosslinking group is derived from dioctylphosphinic acid.

7. A process as in claim 2 wherein the crosslinking group is derived from phenylphosphinic acid.

8. A process as in claim 2 wherein the crosslinking group is derived from dibutyl phosphinic acid.

9. A process as in claim 2 wherein the crosslinking group is derived from phosphinic acid.

10. A process as in claim 2 wherein the crosslinking group is derived from benzoic acid.

11. A process as in claim 2 wherein the crosslinking group is derived from an oxygen acid of arsenic.

12. A process as in claim 1 wherein the trivalent, octahedral metal is iron.

References Cited

UNITED STATES PATENTS 3,384,605    5/1968   Saraceno _____ 260—2

FOREIGN PATENTS 1,018,456    1/1966   Great Britain.

OTHER REFERENCES

Podall et al., "Jour. Polymer Science," Part B, September 1963, pp. 457–459.

SAMUEL H. BLECH, Primary Examiner

U.S. Cl. X.R.

260—47, 79.3

PO-1050
(5/69)

UNITED STATES PATENT OFFICE
CERTIFICATE OF CORRECTION

Patent No. 3,483,142          Dated  December 9, 1969

Inventor(s)  Anthony Joseph Saraceno

It is certified that error appears in the above-identified patent and that said Letters Patent are hereby corrected as shown below:

Column 3, line 72, "agen" should read --agent--; Column 5, line 70 that portion of the formula reading $$(CH_{17})_2O)_2 \quad \text{should read} \quad (C_8H_{17})_2O)_2$$

Column 7, claim 2, line 53 "avid" should read --acid--; Column 8 Claim 2, line 1 "X-B" should read --VB--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents